Nov. 6, 1962 R. W. REACH ET AL 3,063,036

INFORMATION HANDLING APPARATUS

Filed Sept. 8, 1958 5 Sheets-Sheet 1

INVENTORS
ROY W. REACH
WILLIAM M. KAHN

BY Henry L. Hanson
ATTORNEY

Nov. 6, 1962 R. W. REACH ETAL 3,063,036

INFORMATION HANDLING APPARATUS

Filed Sept. 8, 1958 5 Sheets-Sheet 5

3,063,036

INFORMATION HANDLING APPARATUS

Roy W. Reach, Sudbury, and William M. Kahn, Brighton, Mass., assignors to Minneapolis-Honeywell Regulator Company, Minneapolis, Minn., a corporation of Delaware Filed Sept. 8, 1958, Ser. No. 759,674
4 Claims. (Cl. 340—172.5)

A general object of the present invention is to provide a new and improved circuit useful in the processing of data in an automatic data processing system. More specifically, the present invention is concerned with a data processing apparatus which incorporates a new and improved time sharing circuit which is characterized by its ability to provide for a predetermined signal scanning on a plurality of input signal lines for purposes of controlling time sharing or time multiplexing in a data processing system.

In a copending application of Henry W. Schrimpf entitled "Information Handling Apparatus," Serial Number 754,253, filed August 11, 1958, now Pat. No. 3,029,414, there is disclosed a new data processing system which incorporates a pair of traffic control circuits or time sharing control circuits in a data processing system. These time sharing circuits permit the data processing system to operate with a plurality of input and/or output devices on a time sharing basis. Further, the traffic control circuits are also employed in the data processing system described in said Henry W. Schrimpf application for purposes of time sharing ordered programs within the same data processor. The present invention is directed to a representative embodiment of a time sequencing circuit useful with a data processing system where such a circuit is adapted to scan a plurality of input lines at electronic speeds and select in sequence the input demand lines calling for an operation. The scanning which is effected by the present circuitry is accomplished at such a rate that it will not slow down or otherwise interfere with the normal operation of the data processor.

It is therefore an object of the present invention to provide a new and improved signal scanning and selection circuit which is capable of scanning a plurality of operational demand lines in sequence.

Another more specific object of the present invention is to provide a new and improved circuit for controlling the operation of a data processing system on a selectable time shared basis in accordance with the extent to which time sharing is desired.

In a traffic control system used with a data processing system, the absence of a signal on any demand line from the data processor system or from the associated devices may be considered as an error and consequently it is desired that the sequencing or scanning circuit be stopped.

Thus, another feature of the present invention lies in the ability of the circuitry to provide for the sequential scanning in proper sequence of a plurality of demand lines and producing a special indication that no demand lines are calling for an operation.

It is therefore a further object of the present invention to provide a new and improved sequence selection circuit for a plurality of demand lines in a data processing system where, upon a loss of all demand line signals, the sequencing circuit will stop.

Still another object of the present invention is to provide a new and improved time sequencing circuit for a data processing system which is in effect fail safe due to the fact that the circuitry utilized incorporates checking features which prevent the circuitry from creating a false or multiple sequence selection in the data processor at any one instant.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
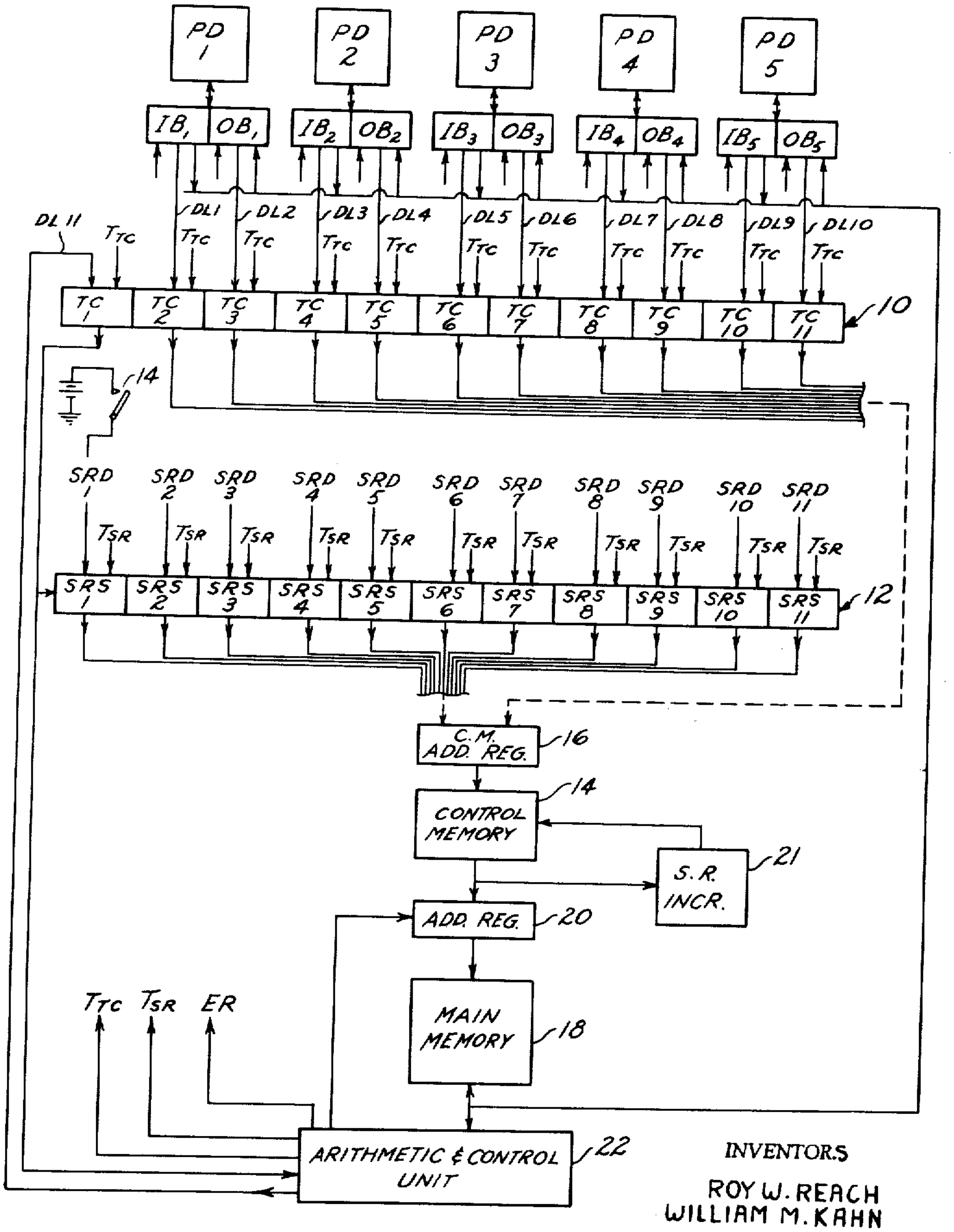
FIGURE 1 is a diagrammatic representation of a data processing system incorporating the principles of the present invention.

Referring first to FIGURE 1, there is here indicated a diagrammatic illustration of a data processing system incorporating the features of the present invention. As illustrated in FIGURE 1, there are included in the overall system a plurality of peripheral devices PD1, PD2, PD3, PD4 and PD5. These preipheral devices may well take the form of magnetic tape storage units each of which is capable of delivering digital data or receiving digital data with respect to the rest of the system. Insofar as the present invention is concerned, the peripheral devices may also be input devices such as a document reading device capable of delivering digital data to the output thereof. One or more of the peripheral devices may also be an output device in the form of a document printer or a document punch. As will be readily apparent from the description that follows, the peripheral devices may well be file reference units, random access units, intermediate drum memories, typewriters, cash registers, time clocks, etc.

Each of the peripheral devices PD1–PD5 is shown with a pair of buffering registers connected thereto. In the case of a magnetic file or tape unit, there will normally be an input buffer IB and an output buffer OB associated with each device. In the case of a document reader, normally only one input buffer is required. In the case of an output device, normally only one output buffer is required. There are shown five input buffers $IB_1$–$IB_5$ and five output buffers $OB_1$–$OB_5$. The buffers may well be of the type illustrated in the above mentioned application or may be of the type illustrated in a copending application of Robert D. Kodis bearing Serial Number 632,165, filed January 2, 1957. The buffers may be arranged in any desired manner to store one or more system "words" of information.

Each of the buffer circuits IB and OB are arranged to produce a suitable signal indicating when the respective buffers are in a condition to receive or transfer information with respect to the rest of the data processor. The signals may be referred to as demand signals and their presence in the circuit signifies to the rest of the data processing system that the particular peripheral device associated with the buffer unit is active and is in a condition to effect a desired data manipulation with respect to the rest of the data processor. In the normal situation, the buffer units will be used for purposes of data transfer between the central processor and suitable peripheral devices. The peripheral devices may well be cascaded through suitable switching circuits so that a plurality of devices may be operated in conjunction with a single buffer unit. Whether or not a particular peripheral device is operating will be dependent in part upon the type of program being carried out by the data processing system. A complete data processing system with which the present invention may be used is described in the copending application of Henry W. Schrimpf, filed January 25, 1957, and bearing Serial Number 636,256.

One additional circuit requirement with respect to the buffer units is that the buffer units perform when they receive an appropriate operational signal which signifies that the data processor is in a condition to work with the particular buffer unit in demand. This is derived from the traffic control circuits hereinafter described.

The sensing of the peripheral device demand signals and the creation of the peripheral device operational signals is carried out by a traffic control circuit 10. Basically, the traffic control circuit comprises a means for continuously scanning in sequence all of the demand lines that are connected thereto. As illustrated in FIGURE 1, there are 11 stages in the traffic control circuit, each stage being identified as a traffic control stage TC. Each demand line connected thereto, which has an operational demand signal or an active signal, will be sensed in its proper sequence and an operational control signal will be generated by the traffic control circuit for purposes of initiating a control operation directly related to the demand line which is then active. As illustrated, the traffic control stages TC2–TC11 are associated with the demand lines DL1–DL10, the latter having their origin in the buffering circuits of the peripheral devices PD1–PD5. An additional demand line DL11 is associated with the central processor portion of the data processing system.

Another feature of the traffic control circuit 10 is that in the process of scanning, any demand line which is not active will be bypassed substantially immediately and the circuit will scan until such time as it finds an active demand line with the scanning being accomplished at a very fast rate. This rapid scanning of the traffic control is desirable for the reason that no data processor operational time is wasted while the traffic control circuit searches for an active demand line. Once a demand line has been found that is active and calling for operation, a single data manipulation will be performed with respect to the related circuits and this may be, for example, the transfer of a plurality of bits of data into or out of the memory circuits associated therewith. In the described embodiment, the transfer or data manipulation performed when each operational step is performed is a function of the memory cycle of the high speed memory of the system. A more detailed discussion of the logic of this traffic control circuit 10 will be understood by making reference to the circuitry of FIGURE 2 which is discussed below.

Continuing with the description of the circuitry illustrated in FIGURE 1, it should be noted that the circuitry incorporates a further traffic control circuit 12 which is a circuit for selecting sequence registers. As pointed out above, the present circuit is one which is capable of performing a plurality of programs at substantially the same time on a time sharing basis. A particular program is normally defined in terms of a sequence register location within the control memory of the system. In effect, the sequence register number stores the data identifying the location of the next order in a program which is to be performed. The next order will be stored in the main memory. As illustrated, there are eleven stages in this sequence register traffic control circuit identified as stages SRS1–SRS11.

By way of illustration, the demand condition for a particular sequence register for a program may be initiated by manual means such as by way of a switch 14 which connects a suitable signal source to the related sequence register selection stage SRS. As will be apparent to those skilled in the art, the calling of a particular sequence register into effect may be accomplished automatically by appropriate subsequencing brought about in a program or by branching orders which effect the desired transfer from one sequence register to another in order to perform branch operations. Such circuitry for initiating an automatic transfer is discussed in connection with FIGURE 5.

The traffic control circuit 12 functions basically the same as the traffic control circuit 10 in that the circuit is arranged to scan in sequence the demand lines SRD and stop at any demand line which is active and calling for operation. The time that the traffic control circuit will be locked in any particular sequence register selection position will be a function of the length of the order which is to be performed by the particular sequence register selection. As soon as the order has been completed, the circuit will step to the next demand line which is active. As with the traffic control circuit 10, the scanning in the traffic control circuit 12 is carried out at a relatively high rate of speed so that no system operational time is wasted in searching for the next demand line which is active.

The traffic control circuits 10 and 12 are each connected to a suitable control circuit means for the data processor which is here illustrated as a control memory 14 having a suitable address register 16 connected to the input thereof. The control memory 14 is adapted to store separate control data for each traffic control stage TC and sequence register selection stage SRS of the traffic control circuits 10 and 12. The memory may be a coincident current memory of well known type or may comprise a plurality of storage registers adapted to contain sequence identifying data. The addressing circuit 16 for this control memory 14 will, of course, be dependent upon the type of storage incorporated in the control memory 14. If a coincident current memory is incorporated in the control memory 14, the address selection circuits therefor may be of the type illustrated and described in the above mentioned application of Henry W. Schrimpf. This selection of a particular address will be in accordance with the particular traffic control stage or sequence register selection stage that is active at any one particular instant.

The output from the control memory 14 will be in the form of digital data defining an address location in the main memory 18. The address from the control memory 14 will be dropped into an address register 20. The memory 18 and the selection circuits may also take the form of the coincident current memory and address selection circuits illustrated and described in the above mentioned application of the present inventor. The sequence data from the control memory 14 may be incremented after each read out by a suitable incrementing circuit 21 which functions to add unity to each number which is read out of the control memory 14. Once incremented, the sequence or control number is then reinserted in its proper location in the control memory 14.

Associated with the main memory 18 is a suitable arithmetic and control unit 22, the latter being of the type which is adapted to perform prescribed data manipulations in accordance with an ordered program. The above mentioned application of Henry W. Schrimpf describes a suitable arithmetic and control unit of the serial type which could well be adapted for use in the present system. However, as will be apparent to those skilled in the art, the present invention may be well adapted to a parallel system. The parallel system has certain speed advantages and consequently in some situations would be more compatible with the multiple traffic control circuits of the present invention in terms of efficient use of the overall data processing system.

The arithmetic and control unit 22 is adapted to produce a demand signal DL11 for use in the traffic control circuit 10 and this demand line signal will normally always be active when a system is in operation. Consequently, the demand line DL11 may well be a line activated by the check circuits in the arithmetic and control unit 22 and will remain active until such time as there is an indicated central processor failure. Again, the check circuits may well be of the type illustrated in the above mentioned application of the present inventor.

The arithmetic and control unit 22 additionally produces appropriate timing signals $T_{TC}$ and $T_{SR}$ for use in stepping the traffic control circuits 10 and 12. The circuits for producing these signals are discussed below in conjunction with FIGURE 3.

In order to facilitate an understanding of the figures that follow, a preliminary discussion of the operation of FIGURE 1 is in order. By way of example, assume that the system illustrated in FIGURE 1 is being examined in the middle of a data processing operation. At the particular instant herein assumed, the peripheral device PD1 has its input buffer $IB_1$ in demand. Additionally, the peripheral device PD5 has its output buffer $OB_5$ in demand. As mentioned above, in the absence of an error in the central processor, the AU–CU demand line DL11 will also be in demand.

It is assumed that at the start of the instant operation, the AU–CU 22 is in the middle of a multiple cycle order. At the start of the scanning cycle of the traffic control 10, with demand line DL11 active, the first traffic control stage set will be TC1. When set, a signal will be produced by TC1 which is fed to the arithmetic and control unit 22 for initiating a further cyclic operation of the AU–CU 22 in connection with the performance of the program order then in process. The time length of this signal is directly related to the cycle time of the main memory 18. At the end of this cycle time, which may be a single cycle of a multiple cycle order, the apparatus will, by way of the traffic control timing pulse $T_{TC}$ activate the traffic control circuit 10 so that it steps to the next traffic control circuit having a demand line active.

As assumed here, the next traffic control stage having a demand line active will be TC2. An operational control signal will be generated by TC2 and will be effective by way of the control memory address register 16 and control memory 14 to supply a signal to the address register 20. The address of the address register 20 will then activate a preselected memory location of the memory 18 so that data may be transferred from the input buffer $IB_1$ into the main memory 18 at that address location. This again will take place in a single memory cycle.

On the occurrence of the next timing signal, the traffic control 10 will effectively scan all the demand lines and will lock onto the next demand line which is active. In the assumed situation, the traffic control TC11 has demand line DL10 active thereon signifying the output buffer $OB_5$ is in demand. The signal from the traffic control circuit stage TC11 is applied again by way of the control memory address register 16 and the control memory 14 to supply an address to the address register 20. Data from the address selected by way of the address register 20 will be transferred from the main memory 18 into the output buffer $OB_5$. This again will be accomplished in a single memory cycle of the main memory. The apparatus will immediately step back in the traffic control circuit 10 to the first traffic control stage TC1. At this point a further cycle will be performed insofar as the order in the arithmetic and control unit 22 is concerned. After the AU–CU cycle has been completed, as initiated by the signal from the traffic control stage TC1, the circuit 10 will again scan the peripheral device demand lines for an active line and will lock up on that line which is next in sequence after the traffic control stage TC1.

In the foregoing example, no reference has been made to the traffic control for the sequence register selection circuits. In the above example, it was assumed that a single sequence register was being utilized insofar as an ordered program in the central processor is concerned. If more than one sequence register demand line SRD is active or in demand, the traffic control circuit 12 for the sequence register selectors will be effective to pick up the next demand line SRD which is active as soon as the previous order in process in the AU–CU 22 is completed, providing this is an order which will permit the traffic control 12 to seek the next order in a further program. The scanning will be initiated by the $T_{SR}$ timing signal from the AU–CU 22, the latter being derived from a signal which indicates the completion of the previous order and a signal from the traffic control circuit 10 indicating there is a need for a data manipulation by the data processor in the next order in the program. It will thus be apparent that insofar as the second traffic control circuit 12 is concerned, the stepping of the scanning circuit is a function of the number of cycles associated with any particular data manipulation within the AU–CU 22 and will normally be a multiple number of memory cycles wherein the memory cycles relate to the performance time of a particular order in a program. This is to be contrasted with the traffic control stepping effected in each memory cycle in the traffic control circuit 10.

Figure 2A:
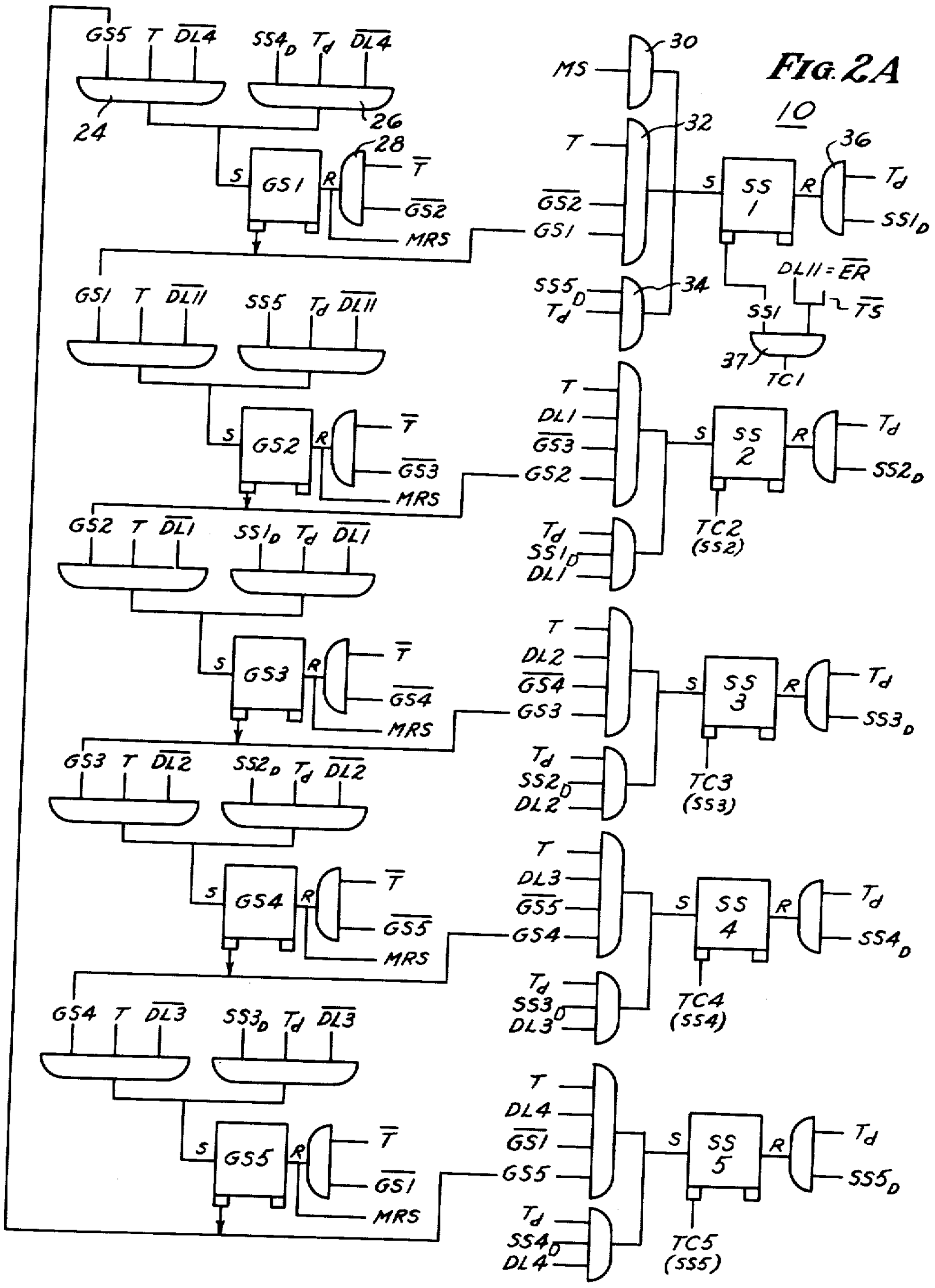
FIGURE 2 is the diagrammatic representation of the logical circuit for implementing the traffic control circuits incorporated in FIGURE 1.
Figure 2B:
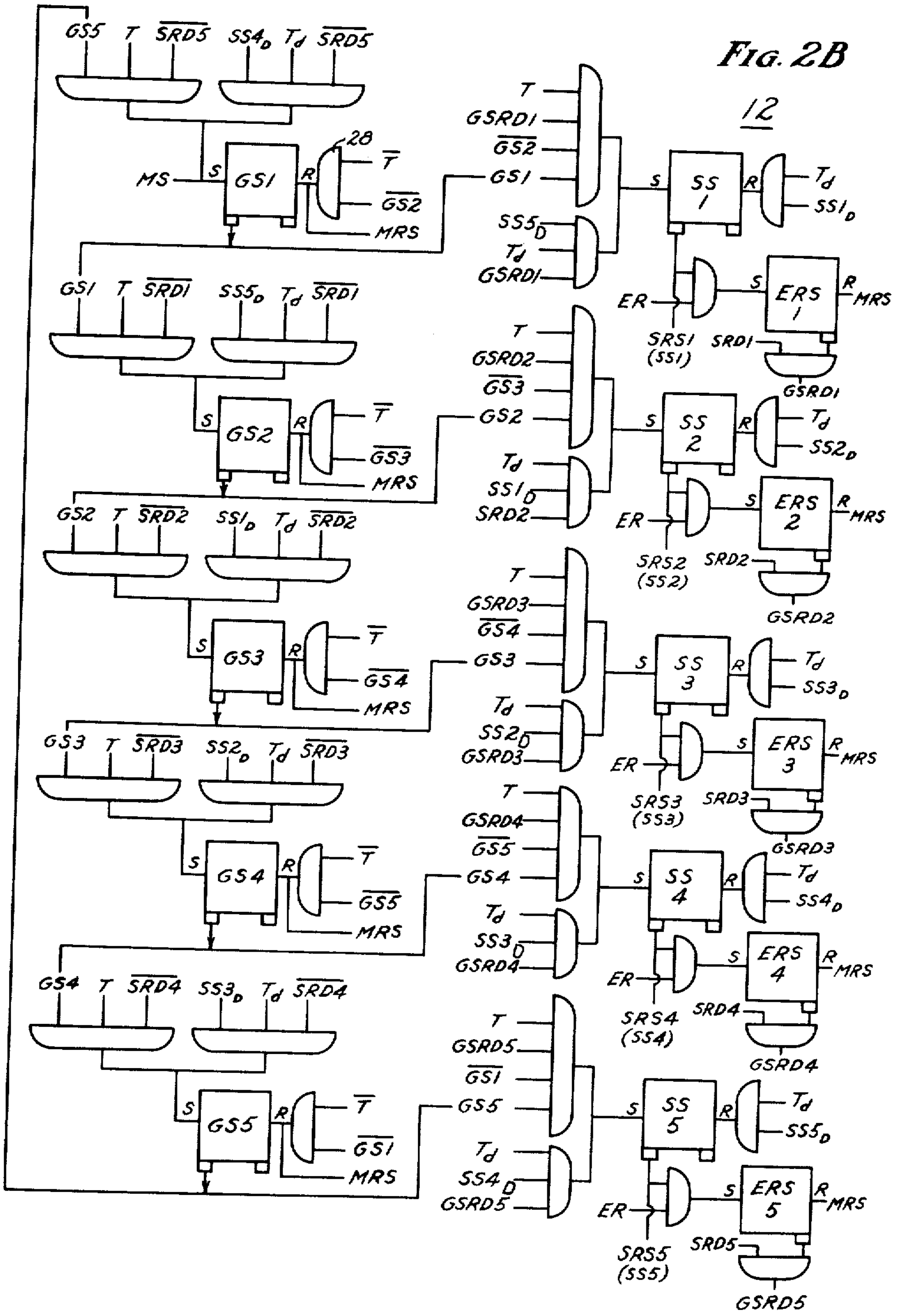

Referring next to FIGURES 2A and 2B, there is here illustrated in diagrammatic logical detail one way in which the traffic control circuits 10 and 12 of FIGURE 1 may be implemented. As pointed out above, these circuits are arranged so that they will sequentially scan in order demand lines connected thereto and create an operational control signal which may be utilized to indicate that a particular demand line is active or calling for operation.

The circuitry in FIGURE 2A is illustrated in terms of a five stage circuit instead of the eleven stages illustrated in the traffic control of FIGURE 10. The extension of the circuitry from five to eleven or more stages will be obvious.

The glossary of terms applicable to the symbols used in FIGURE 2A is covered in the following table:

*Table I.—FIGURE 2A*

| | |
|---|---|
| DL | Operational demand line |
| ER | Error signal |
| GS | Gate select circuit (1 for each stage of the traffic control) |
| MRS | Manual reset signal |
| MS | Manual start signal |
| SS | Sequence selector |
| $SS_D$ | Sequence selector signal delayed |
| T | Timing pulse for stepping the traffic control circuits ($T_{TC}$ and $T_{SR}$ in FIGURE 1) |
| $T_d$ | T differentiated |
| TC | Traffic control output |
| TS | Total stop on error |

Each stage of the traffic control circuit, as illustrated, comprises a pair of flip-flops GS and SS. These flip-flops GS and SS are adapted to be set by certain logical functions. Thus, the flip-flop GS1 has a pair of input gating circuits 24 and 26 buffered together on the set line of the flip-flop. The gate 24 has applied to the input thereof a GS5 signal, indicating the GS5 flip-flop has been set, the timing signal T, and the negation of demand signal for the fifth stage $\overline{DL4}$. The gate 26 has as an input an SS4 signal representing a set state of the sequence selector flip-flop SS4, the timing signal $T_d$ and the negation of a demand signal for the fifth stage $\overline{DL4}$. Either one of the gates 24 or 26 will set the flip-flop GS1 providing all the inputs on one or the other of the gates are active at the same time.

The flip-flop GS1 is adapted to be reset by way of a reset gate 28, the latter having a pair of inputs representing the negation of the timing signal $\overline{T}$ and the negation of the gate select signal $\overline{GS2}$. A manual reset signal MRS may also be used to reset the GS flip-flop.

The sequence selector flip-flop SS1 is illustrated with three input set gates 30, 32, and 34. Set gate 30 is a manual start gate that may be utilized to set the overall traffic control circuit into operation at the start of any particular program. The gate 32 has on the input thereof a timing signal T, a signal $\overline{GS2}$, and the signal GS1. When all of the aforementioned signals are present, a gate output signal will be effective to set the flip-flop SS1. The gate 34 has two inputs, namely signal SS5, from the flip-flop SS5 and the differentiated timing signal $T_d$. When both of these signals are present, the gate 34 will be effective to set the flip-flop SS1. A reset gate 36 is included for resetting the flip-flop SS1 when the signals $T_d$ and $SS1_D$ are present.

The sequence selection circuit SS1 is normally arranged so that when the system is in operation, the circuit will be in the set state. The demand line for the first stage is not used to directly set the SS1 circuit but is instead gated with the output of the SS1 circuit. For this purpose there is provided a gate 37 having one input from the SS1 circuit and a second input which is derived from two buffered signals DL11, which indicates that there is no error in the AU–CU of the system and a negation of a Total Stop signal $\overline{TS}$. The Total Stop signal may be produced by an operator actuated switch, not shown. The output of this gate is then the traffic control output signal TC1. The reason for the added gate 37 in this one particular circuit is to permit the circuit to continue to function under certain conditions where it is desired to complete transfers associated with the peripheral devices. This is more fully discussed below.

The other stages of the traffic control circuit are basically the same as the first stage. However, the counter part of the gate 37 in stage one is eliminated in the other stages and the demand lines for these stages, DL1, etc. are gated into the input set gates for the sequence select flip-flops SS. The outputs of the SS stages may then be used directly to produce the traffic control outputs TC2, TC3, TC4, and TC5.

The implementation of the gating circuits and the flip-flops in terms of specific hardware is well known in the art. However, reference may be made to the specific circuits illustrated in the reference text "High Speed Computing Devices," by E.R.A., 1950, McGraw-Hill Book Company.

An understanding of the operation of the circuit of FIGURE 2 may be best had by reference to specific examples. In order to condition the traffic control circuit of FIGURE 2 for its sequencing operation, it is first necessary to manually condition the circuit for operation. This is achieved by way of the gate 30 which is adapted to pass a manual start MS signal to set the flip-flop SS1. After the circuit has been set, it is assumed that the first demand condition is produced by way of demand line DL11. It is further assumed that all other demand lines are inactive, or the negations of these demand lines are active. As soon as the timing pulse T appears, an attempt will be made to set the GS flip-flops. The flip-flops GS1 and GS2 will not be set for the reason that the gating circuits on the inputs thereof are not conditioned to pass signals to the set input of either of the two flip-flops. However, the flip-flop GS3 will be set since the $SS1_D$ signal will be present, the $T_d$ signal will be present, and the $\overline{DL1}$ signal will be present. With GS3 set, the flip-flop GS4 can be set by way of the left input gate having the active signal GS3 present, the timing signal T present, and the $\overline{DL2}$ signal present. Further, the set state of the GS4 flip-flop will be propagated down to set the GS5 flip-flop in a manner corresponding to that in which the GS4 flip-flop is set. The GS5 set state will be propagated through to the gate 24 on the input of the GS1 flip-flop and this flip-flop will also be set.

As assumed herein at the start, the flip-flop SS1 was set. However, as soon as the timing pulse in its differentiated form $T_d$ is applied to the gate 36 along with the delayed set signal from the flip-flop SS1, the SS1 flip-flop will be reset. Thus, when the GS signal has been propagated from the flip-flop GS3 through GS5 and back to GS1, the sequence select flip-flop SS1 will be able to switch back to the set state. The setting of the flip-flop will be by way of the gate 32 inasmuch as the timing signal T will be present, signal $\overline{GS2}$ will be present, and signal GS1 will be present. When set, the sequence selector output SS1 may be used to provide a gate signal for gate 37 to produce on the output a traffic control signal TC1. TC1 is used in the control memory address register 16 in FIGURE 1 with the address selector being directly related to the particular stage in the traffic control which the demand line operates. In the event that the TC1 stage is connected to the arithmetic and control unit 22, the signal may be utilized for stepping a cycle counter associated with the performance of a particular program order.

After a predetermined time which is basically a function of the cycle time of the main memory 18 in FIGURE 1, the timing signal T will become inactive and the signal $\overline{T}$ will become active. As soon as the signal $\overline{T}$ is active, the gate 28 having a further input $\overline{GS2}$ will pass a signal to reset the flip-flop GS1. When the flip-flop GS1 is reset, the signal $\overline{GS1}$ and the signal $\overline{T}$ acting on the reset gate of the flip-flop GS5 will reset this flip-flop. In a similar manner this resetting of the flip-flop GS5 will ripple back until all of the GS circuits which have been set are now reset.

As soon as the next timing signal T is received, the apparatus will once again go through the same rippling action with the first gate select flip-flop GS3 being set and this set condition will ripple through until the flip-flop GS1 is set. This will once again be effective to set the flip-flop SS1 which is always reset at the start of the timing signal.

In the event that all of the demand lines DL are active, the circuit is so arranged that the sequence selector flip-flop SS1–SS5 will be activated in sequence until all have been appropriately sensed and the process will be repeated continually.

Assume next that two demand lines are up, DL11 and DL2. When SS1 is set, DL11 will pass through the gate 37. As soon as the next timing pulse is received for the next step, the apparatus will step to sense the DL2 demand line. In other words, at the instant following the timing pulse in which the sequence selector flip-flop SS1 is set, the flip-flop SS1 will be reset. However, since the input set gate to the flip-flop GS3 has a delayed input from the set side of the flip-flop SS1, it will be possible to set the flip-flop GS3. Once set, the flip-flop GS3 will condition the upper input gate of the flip-flop SS3 so that with the demand line DL2 active on this gate, it will be possible to set the flip-flop SS3. The flip-flop SS3 will be reset as soon as the next timing or stepping signal is received.

If the demand line DL3 is up for the fourth stage at the time that the next timing pulse T is received, the flip-flop SS4 will be set. The setting of this flip-flop will be achieved by way of the lower input gate having on the input the differentiated timing pulse $T_d$, the set signal from the flip-flop SS3, and the active DL3 demand line. During the time interval between the end of the timing pulse T which set the flip-flop SS3 and the timing pulse T which sets SS4, the gate selection flip-flops GS will all be reset. In the case of the flip-flop SS4 being set through the lower input gate, it will be apparent that the setting of a GS flip-flop is not required. The corresponding lower gates on the other SS flip-flops will be used in setting the flip-flops when the step is from the immediately preceding flip-flop.

This sequencing and sequential sensing of the active demand lines will continue until all of the demand lines which are active have been sensed in their proper order. The process will then be repeated by way of the recirculation or feedback in the circuit.

In the event that an error should occur in the AU–CU, the error signal $\overline{ER}$ will become inactive on the input of the gate 37. If the Total Stop signal should be active, so that the gate signal $\overline{TS}$ was not present, the output of the gate 37 will cease and there will be no TC1 signal present. In this event, it is desired that any active demand condition indicated by one or more demand lines DL1–DL4 from the peripheral devices will continue to be effective. In other words, the presence of a demand line signal on any of the gates for the SS flip-flops will continue to be sequentially sensed in their numerical order until such times as these demand lines become inactive. As these demand lines will normally be associated with peripheral devices associated with input and output transfers, the demand lines will become inactive as soon as a particular transfer has been completed. Normally, the demand lines associated with the peripheral devices will not again become active until such time as a further order has been called out from the central processor indicating a need for further operation. Since the TC1 signal will not be operating in the central processor, further orders can not be called into effect.

If the Total Stop signal is not present on the gate 37 so that the signal $\overline{TS}$ is present, the output of the gate 37 of TC1 will be applied to the central processor in the normal manner. However, the TC1 signal will not be utilized in conjunction with any program where an error occurred as will be apparent from a consideration of FIGURE 2B.

The sequence register selection traffic control circuit 12 is illustrated in logical detail in FIGURE 2B. In order to simplify the comparison of FIGURES 2A and 2B, common reference terms have been applied to the corresponding elements which are related in the two circuits. The glossary of terms associated with FIGURE 2B are tabulated in the following table:

*Table 2.—FIGURE 2B*

| | |
|---|---|
| ER | Error signal |
| ERS | Error storage |
| GS | Gate select |
| GSRD | Gated sequence register demand |
| MRS | Manual reset signal |
| MS | Manual start |
| SRD | Sequence register demand |
| SRS | Sequence register select output |
| SS | Sequence selector |
| $SS_D$ | Sequence selector delayed |
| T | Timing pulse for stepping traffic control circuit |
| $T_d$ | T differentiated |

Modifications of FIGURE 2B with respect to FIGURE 2A are mainly in connection with the circuits utilized in the event of an error. It is essential that means be provided for not only indicating the presence of an error but also storing the fact that an error has occurred. For this purpose, a plurality of error flip-flops ERS1–ERS5 are illustrated. The set gate associated with the error flip-flops ERS has an input from the associated sequence selection flip-flops SS and a suitable error circuit, not shown, which will produce a signal ER. The error storage flip-flops ERS are used to control the gating of the demand signals for the associated stages of the sequence register selection circuits. Thus, in the absence of an error, there will be produced a gated sequence register demand signal GSRD providing there is a sequence register demand signal SRD calling for the operation of a particular stage.

The other modification of the present circuit over that of FIGURE 2A lies in the placing of the manual start signal MS on the set input of the GS1 flip-flop. This is used to prime the circuit for operation in the normal sequencing manner. This priming is done at this point for the reason that there are no restrictions placed on the circuit as to which SRD lines will be active at any instant.

The circuitry of FIGURE 2B is also illustrated with five stages, instead of the eleven shown in the circuit 12 of FIGURE 1. It will be apparent that this may be extended to any desired number of stages.

In operation, the present circuit will function to set the associated sequence selection flip-flops SS in their proper sequential order so that the sequence register demand signals will be present to select a particular program in the central processor. Thus, if the signals SRD1, SRD3 and SRD4 are present, the circuit will function in proper sequence to select first the flip-flop SS1 and produce thereby the sequence register select signal SRS1. Upon the occurrence of the next timing pulse, the SS1 flip-flop will be reset and the circuit will step to the SS3 flip-flop so that the signal SRS3 will be active. This latter stepping will be by way of the upper set gate of the SS3 flip-flop, the latter received a signal from flip-flop GS3 which has been set on an $SS1_D$ signal, a timing signal $T_d$ and the negation signal $\overline{SRD2}$.

When the next timing pulse occurs, the circuit will step so that the flip-flop SS4 will be set. The setting of this flip-flop will be by way of the lower set gate which has on its input a differentiated timing signal $T_d$, the sequence select signal SS3 and the gating sequence register demand signal GSRD4. At the completion of the operation associated with the sequence select flip-flop SS4, the circuit will again recycle starting again at SS1.

In the event that an error occurs in the course of performing an order called out by any one of the sequence register selection signals SRS, the particular demand line used for setting the SS stage associated therewith will be gated off. This will occur for the reason that the error signal will set the associated flip-flop ERS and the gate on the output thereof producing the signal GSRD will be closed. Whether or not the apparatus will be permitted to step into the next stage which is in demand will be dependent upon whether or not the total stop signal is active in FIGURE 2A. If the total stop signal is such as to prevent the production of the signal TC1 in FIGURE 2A, no further sequencing will take place in FIGURE 2B. The reason for this will be apparent when it is noted that in FIGURE 3, the TC1 signal is required on the gate 46 in order to produce the timing or stepping signal TSR. However if the TC1 signal is permitted to continue, any program which may be underway, independent of the program associated with the error condition, will continue independently of the program where the error occurred. In this way, it is possible for an operator to determine whether he wants to continue performing those programs where there is no error or whether he wants to stop the entire system until the particular program having an error is corrected. This arrangement further enhances the flexibility of the system.

As pointed out above, in the event that all of the demand lines on either the traffic control circuits 10 and 12 should become inactive at the same time, this will be indicative of an error. The reason for this is that under normal operative conditions, the demand line for the central processor will always be active on the traffic control circuit 10 and at least one sequence register demand line will be active in the traffic control circuit 12. In the event that all of the demand lines should go down, the traffic control circuit should lock up to prevent further operation.

A lock-up of the traffic control circuits of FIGURES 2A and B will be effected by a condition wherein all of the gate selection stages GS are in the set state at the same time. Thus, if the demand line DL11 should become inactive after it had once been active to set the sequence selection flip-flop SS1, the presence of the next timing signal $T_D$ will reset the flip-flip SS1. Since no other demand line is up, the first GS circuit which will be set will be GS3 by way of the second input gate having the signal $SS1_D$ applied thereto. With GS3 set, it is possible to set GS4, GS5, GS1, and GS2 in that order. Now, all of the gate selection circuits GS are in the set state. As soon as the timing pulse $\overline{T}$ comes up, an attempt is made to reset each of the gate selection circuits GS. However, since all of them are set, and each of the gates requires a reset signal from at least one other GS circuit in order to reset, the circuit will remain locked in that condition and it will be impossible to create any further setting of the sequence selector flip-flop SS. Consequently, the system will stop its data processing. In order to put the circuit back in operation, it is necessary to reset the GS flip-flops and this may be accomplished by way of a manual reset signal MRS which may be buffered together with each of the automatic reset gates normally used in the circuit.

Both of the traffic control circuits 10 and 12 of FIGURE 1 may be implemented in the manner illustrated in FIGURES 2A and 2B. However, the timing signals for the two traffic control circuits are derived in a slightly different manner for the reason that the timing for the first traffic control is based upon each memory cycle of the data processor. In the case of the second traffic control circuit 12, the timing is based upon the order performance time of any particular order or combination of orders called into operation in the course of a program selected from the sequence register selection circuits.

Figure 3:
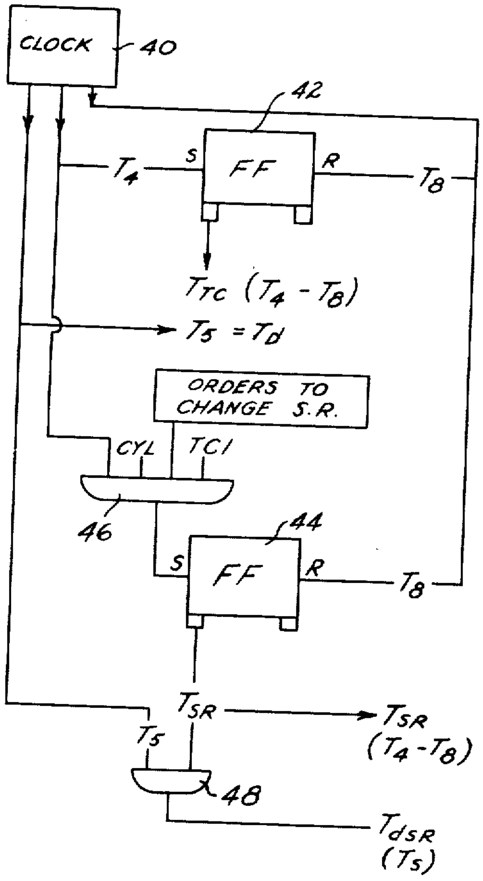
FIGURE 3 is a diagrammatic representation of certain further logical circuits required for producing the timing signals required in the traffic control circuit of FIGURE 2.

One manner in which the timing signals may be derived for the two traffic control circuits in FIGURE 1 is illustrated diagrammatically in FIGURE 3. Referring now to FIGURE 3, the numeral 40 represents a suitable timing clock capable of producing spaced timing pulses with a predetermined number of pulses allotted to a particular timing cycle. This timing cycle may, if desired, be directly related to the timing cycle of the main memory 18. This timing cycle may further be defined in terms of pulse periods. The timing clock 40 will normally be located in the central processor and supply timing pulses to other logical circuits besides the particular circuits illustrated in FIGURE 3 . The clock 40 is here assumed to be capable of producing a timing pulse at time $T_4$, a timing pulse at time $T_5$ and a further timing pulse at $T_8$. In order to produce the timing pulse $T_{TC}$, the timing pulse $T_4$ is applied to the input of a flip-flop 42 on the set side thereof. A further timing pulse $T_8$ is applied to the flip-flop 42 on the reset side so that the flip-flop 42 will be in the set state for a time period from time $T_5$ to $T_8$. Inasmuch as the signal $T_d$ is in effect a differentiated form of the overall timing circuit, the differentiated pulse may be created directly from the clock circuits 40 by way of a timing pulse $T_5$. In the case of the traffic control circuit 10 of FIGURE 1, these particular timing pulses may be taken directly as indicated. The time length of the differentiated timing pulse $T_d$ is preferably equal to or less than the propagation time of the flip-flops of the traffic control circuits.

The timing signals for the second traffic control circuit 12 are derived in the following manner. A further flip-flop 44 is provided with an input set gate 46. This set gate 46 has a plurality of inputs including the timing pulse $T_4$, a cycle signal CYL indicating the last cycle of an order, a signal derived from a circuit indicating that the sequence register is to change, and a TC1 signal derived from the traffic control circuit as illustrated in FIGURE 2A. Thus, when all of the foregoing signals are present on the gate 46, the flip-flop 44 will be set indicating the start of the timing signal $T_{SR}$. At time $T_8$, a timing pulse from the clock 40 is applied to reset the flip-flop 44. Thus, the timing signal $T_{SR}$ is a four pulse period timing signal of the same duration as the timing signal $T_{TC}$ except that it is related now to the end or the completion of a particular order. In order to produce the differentiated timing signal for the sequence register selector traffic control circuit 12, the timing signal $T_5$ from the clock 40 is applied through a gate 48 when the $T_{SR}$ signal is present. This is used as a differentiated timing signal in the traffic control circuit illustrated in FIGURE 2B.

A typical order which will normally not create a sequence register stepping signal $T_{SR}$ will be the multiply order. The reason for this will be appreciated when it is recognized that with the normal type of order, the results of the order will be delivered to the main memory prior to the time that the next order is called out. However, in the case of the multiply order, and certain others, the results of the order can not all be delivered in a single order time. In other words, the low order product in a multiply order at the end of the order will be stored in the AU–CU circuits and could normally be delivered to a desired memory location by a transfer order which is next in sequence after the multiply order if both high and low order products are desired. Consequently, all orders in most programmed systems will not properly be used for creating the stepping signal $T_{SR}$.

Figure 4:
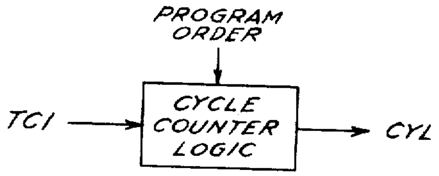
FIGURE 4 is a diagrammatic representation of the apparatus for indicating when the last cycle of selected orders has been performed.

The basic logical considerations involved in producing the CYL signal used in the gate 46 of FIGURE 3 is illustrated in FIGURE 4. In this circuit, a normal program order will call for certain cycle counter steps in the manner described in the above mentioned copending application of the present inventor. For example, certain types of orders may require five, six or seven cycles in order to complete the data manipulation associated with a particular order. Insofar as the present apparatus is concerned, it is necessary that the cycle counter stepping be directly related to the type of order being performed as well as the operational performance signals derived from the traffic control circuit 10 in terms of implementation. Thus, the SS1 signal will be gated into the stepping circuits for the cycle counters which may be of the aforementioned type in the copending application of the present inventor.

Figure 5:
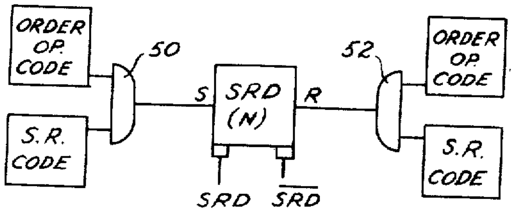
FIGURE 5 is a diagrammatic representation of apparatus for automatically selecting a particular demand line in the system of FIGURE 1.

The basic circuit implementation necessary for automatically selecting a particular sequence register demand line SRD is illustrated in FIGURE 5. Here there is provided an SRD(N) flip-flop which has connected to the set input thereof a gate circuit 50. This gate circuit may have a pair of inputs, one of which is selected to produce a signal in accordance with a particular program order which may then be in process in the central processor. If a particular program order be selected to call for a transfer and demand type of operation, operation control bits from the order may be used to create a signal for use as in setting the flip-flop SRD. Also required on the input of the gate 50 is a control signal from a demand type order which calls for a particular demand line. The code for a particular demand line will normally be written in as an address in the order in a manner well known in the art. A typical order operation code sensing circuit and order address sensing circuits may well be of the type illustrated and described in the above mentioned application of the present inventor.

The resetting of the demand flip-flop SRD of FIGURE 5 may well be done automatically by way of a reset gate 52. This gate has two inputs, one being derived from an operation code sensing circuit and the other in accordance with an address code derived from the order acting on the upper gate leg. Such an order may be defined as a release type of order which is capable of directing the central processor from a particular program associated with one sequence register back to another program, or the discontinuing of a particular program which may have been running as a program ancillary to a main program.

It will be readily apparent that this automatic facility may be used in numerous ways to increase the use to which the present invention may be put. Further, the flexibility of the automatic diversion and simultaneous program operation greatly enhances the power of the overall system in its application to any particular data processing problem.

Figure 6:
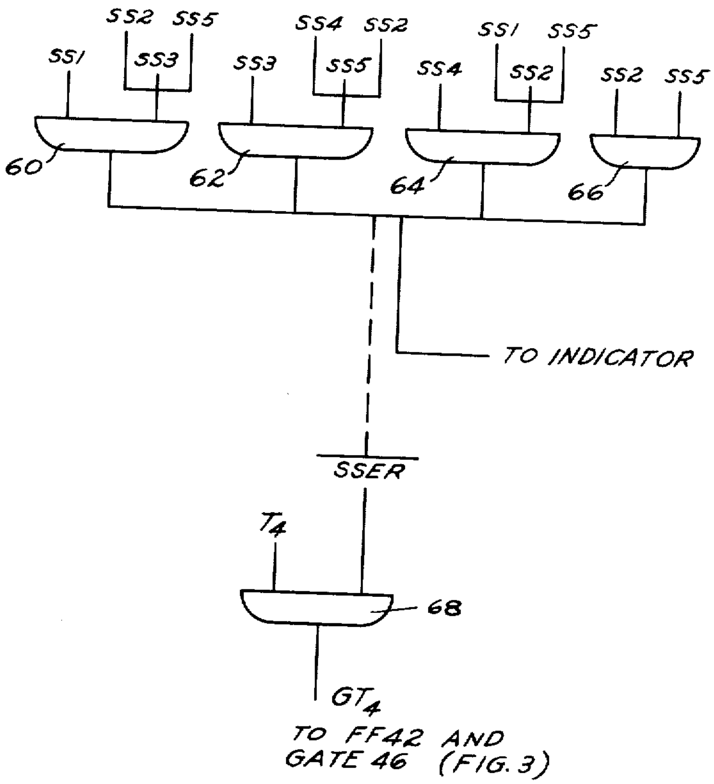
FIGURE 6 is a diagrammatic representation of checking circuitry that may be used in the system.

The circuitry of FIGURES 2A and 2B may also be checked for operability by a circuit such as illustrated in FIGURE 6. The circuit of FIGURE 6 may be used to stop the system if there are two sequence selections made at the same instant of time. Thus, if more than one SS flip-flop is set, thereby indicating a system malfunction, the circuit of FIGURE 6 will sense this and stop the system operation.

Referring to FIGURE 6 in detail, a logical circuit is illustrated showing four input gating circuits 60, 62, 64 and 66. On the gate 60, if the signal SS1 is present and any one or more of the signals SS2, SS3, and SS5 is present, the gate will open and an error signal SSER will be created. This signal will cause the negation signal $\overline{SSER}$ to become inactive to thereby close a gate 68. The gate 68 is adapted to control the passing of the timing pulse $T_4$ which is used in FIGURE 3 to create the timing signals for the sequencing circuits. If the timing signal is gated off, no sequencing can take place and the system will shut down. An appropriate indicator associated with the gating circuits may be used to indicate the reason for a system shutdown.

It will be apparent that the gate 62, 64, and 66 will function in a like manner to provide an error indication, and a system shutdown in the event that the input functions to these gates indicate two or more SS functions are present at the same instant of time.

Referring back to FIGURE 1, a further operational description is herein given to better understand the manner in which the present data processing system is adapted to perform. In this instance, assume that the only demand line active in FIGURE 1 is demand line DL11 which comes from the arithmetic control unit 22. As pointed out above, in the absence of an error in the AU–CU 22, the demand line 11 will normally be active. If this is the only demand line active on the traffic control circuit 10, during each memory cycle of the central processor as determined by the $T_{TC}$ timing signal of FIGURE 3, the traffic control circuit 10 will make a scanning of all of the stages and then will step back into stage TC1 because of the fact that the demand line DL11 is still active. When it steps back into the TC1 stage, the signal TC1 will be created and will be applied to the cycle counter circuits in the manner illustrated in FIGURE 4 to step the cycle counters to the next cycle which is to be performed in the order then being performed in the central processor portion of the apparatus. This cyclic scanning of the traffic control circuit of FIGURE 1 will continue and as soon as the particular order being performed has been completed, the circuitry of FIGURE 3 will produce the timing signal for the sequence register selection traffic control circuit 12. If the only sequence register in demand is the first one SRD1, the creation of a new $T_{SR}$ signal will result in a scanning of all of the stations in the traffic control circuit 12. In the absence of any other demand line being active, the circuit will step back into stage SRS1 which will call for the next order in the program under control of SRD1.

Insofar as the next order selected by SRS1 is concerned, this will also be performed in a cyclic manner in accordance with cycles which are individually stepped by the traffic control circuit 10.

As pointed out in connection with the description of FIGURES 2A and 2B, the provision of the error indication and storage circuits adds certain operational features to the system that render its use more effective. Thus, if there should be an error and the operator of the system has decided in advance that he does not want to stop the system if the error is one occurring in a single program, the negation of the Total Stop signal $\overline{TS}$ acting in the traffic control gate 37 of FIGURE 2A will permit the continued production of the signal TC1 during each scanning operation of the traffic control circuit 10. However, the gated demand line signal GSRD of the sequence register stage where the error occurred will not become active due to the fact that the error signal is stored and the associated ERS stage is set. Thus, if there should be an error in a program order associated with the second sequence selector stage SRS2, the demand signal SRD2 will not be permitted to act to set the associated sequence select flip-flop SS2 on the next cyclic scanning in the circuit 12. In other words, this stage will be bypassed until such time as the operator acts to manually reset the error storage circuits ERS by a suitable MRS signal. However, other demand lines from programs selected by the operator may continue to be effective until completion.

If the operator desires a total stopping of the system in the event of an error, in the central processor, the signal $\overline{TS}$ will be inactive and the gate 37 of FIGURE 2A can not produce the TC1 signal required in the cycle counter circuits discussed in connection with FIGURE 4. Thus, the SRS stages will not step any further as no timing signal $T_{SR}$ will be produced.

Even though the Total Stop signal is present, and there is an error in the central processor stopping further programmed operation, the traffic control 10 will continue to operate until all transfers underway are complete and the demand lines associated with the peripheral devices are inactive.

When the apparatus is performing with only the central processor operating upon a program selected by the demand line SRD1, the rate of performance of the program will be at its maximum rate in that in effect full time is being devoted to the performance of the one program. In the event that a second sequence register demand line should become active, it will be apparent that the time of the central processor will be divided between the two programs so that the rate of performance of each will be half that of the maximum which can be achieved. This will not be objectionable under most circumstances for the reason that the normal rate of operation for the central processor is high enough that the dividing of the time between two programs will not be objectionable. Further, it will permit a second user of the central processor to get central processor operating time without requiring a system shutdown or special scheduling in order to get a program completed.

Obviously, if all of the sequence register demand lines SRD1–SRD11 are active at the same time, the program performance rate will be accordingly shared with the total number of programs then being performed.

Insofar as the traffic control circuit 10 is concerned, the number of memory cycles that it takes to complete a scanning of all of the demand lines will, of course, be dependent upon the number of demand lines which are active in any particular scanning cycle. Obviously, if all of the demand lines are active, it will take a larger number of memory cycles in order to complete the scanning cycle. The time division will be shared in a manner corresponding to the sharing effected in the traffic control circuit 12.

It will be readily apparent that the number of traffic control stages incorporated in any particular system will be a direct function of the time sharing demands required by a particular user. Inasmuch as the scanning time in the traffic control circuits may be effected at electronic speeds, the fact that a particular demand lines is not frequently required will not materially affect the timing of the overall system. It will further be apparent that the principles of the time sharing circuits of the presently described system are applicable to numerous types of data processing systems well known in the art wherein a scanning of a plurality of input signal lines is desired. It will further be apparent that the particular embodiment of the scanning or sequencing circuits illustrated are only representative in their manner of implementation.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new is:

1. In combination, a plurality of signal operational demand lines, each of said lines being associated with a separate function which will cause the associated signal line to be active when an operation is to be performed with respect to the function, a multiple sequence selection circuit, said sequence selection circuit comprising a plurality of bistable circuits each of which is adapted to have a set input and a reset input, a pair of input signal gates connected to the set input of each of said bistable circuits, a further signal gate connected to the reset input of each bistable circuit, a plurality of gate selection bistable circuits equal in number to the number of sequence selection circuits, each of said gate selection bistable circuits having a set input and a reset input, a pair of signal gating circuits connected to the set input of each of said bistable circuits, a reset gate connected to the reset input of each of said gate selection bistable circuits, means connecting all of said signal lines to said sequence selection circuits so that each input gate for all of said gate selection bistable circuits and all but one of said sequence selection circuits has a separate signal demand line connected thereto, a timing pulse source having time-spaced output pulses, means connecting said timing pulse source to all of said set and reset gating circuits, said timing pulse source and said signal demand lines effecting a stepping of the set state of said gate selection circuits and said sequence selection circuits from one which has had an active input demand line to another which has an active demand line during the time of a single timing pulse, and an output circuit connected to be uniquely activated by each of said sequence selection circuits when locked on an active signal line.

2. In combination, a plurality of signal operational demand outputs, each of said outputs being associated with a separate function which will cause the associated signal output to be active when an operation is to be performed with respect to the function, a multiple sequence selection circuit, said sequence selection circuit comprising a plurality of bistable circuits each of which is adapted to have a set input and a reset input, a pair of input signal gates connected to the set input of each of said bistable circuits, a further signal gate connected to the reset input of each bistable circuit, a plurality of gate selection bistable circuits equal in number to the number of sequence selection circuits, each of said gate selection bistable circuits having a set input and a reset input, a pair of signal gating circuits connected to the set input of each of said bistable circuits, a reset gate connected to the reset input of each of said gate selection bistable circuits, means connecting all of said signal outputs to said sequence selection circuits so that each input gate for all of said gate selection bistable circuits and all but one of said sequence selection circuits has a separate signal demand output connected thereto, a timing pulse source having time-spaced output pulses, means connecting said timing pulse source to all of said set and reset gating circuits, said timing pulse source and said signal demand outputs effecting a stepping of the set state of said gate selection circuits and said sequence selection circuit from one which has had an active demand output to another which has an active demand output during the time of a single timing pulse, and an output circuit connected to be uniquely activated by each said sequence selection circuit when locked on an active signal output.

3. In combination, a plurality of signal operational demand lines, each of said lines being associated with a separate function which is adapted to cause the associated signal line to be active when an operation is to be performed with respect to the function, a cyclically operative multiple stage sequencing circuit having a sequencing cycle time of a predetermined time interval, means connecting all of said signal lines to said sequencing circuit, a timing pulse source having on the output thereof spaced timing pulses with each of said timing pulses being of a time duration in excess of said predetermined time interval, gating means having an input from said timing pulse source and connected to said sequencing circuit so that the sequencing circuit will step through all sequence steps upon the occurrence of a single timing pulse until an active signal line is sensed, means connected to said sequencing circuit to lock said circuit when an active signal line is sensed, and an output circuit connected to be uniquely activated by said sequencing circuit when locked on an active signal line.

4. In combination, a plurality of signal operational demand outputs, each of said outputs being associated with a separate function which will cause the associated signal output to be active when an operation is to be performed with respect to the function, a cyclically operative multiple stage sequencing circuit adapted to sequentially and cyclically step through a predetermined sequence of steps in a predetermined time interval, means connecting all of said signal outputs to said sequencing circuit, a timing pulse source having time-spaced output pulses with each of said timing pulses being of a time duration in excess of said predetermined time interval, gating means having an input from said timing pulse source and connected between the stages of said sequencing circuit so that the sequencing circuit will step through all of its sequence steps upon the occurrence of each timing pulse until an active signal demand output is sensed, at which point said sequencing circuit is locked, and utilization circuit means connected to be uniquely activated by said sequencing circuit when locked on an active demand output.

References Cited in the file of this patent

UNITED STATES PATENTS

| | | |
|---|---|---|
| 2,504,999 | McWhirter | Apr. 25, 1950 |
| 2,675,427 | Newby | Apr. 13, 1954 |
| 2,801,334 | Clapper | July 30, 1957 |